(No Model.)
F. HATCH.
NUT LOCK.
No. 362,742. Patented May 10, 1887.
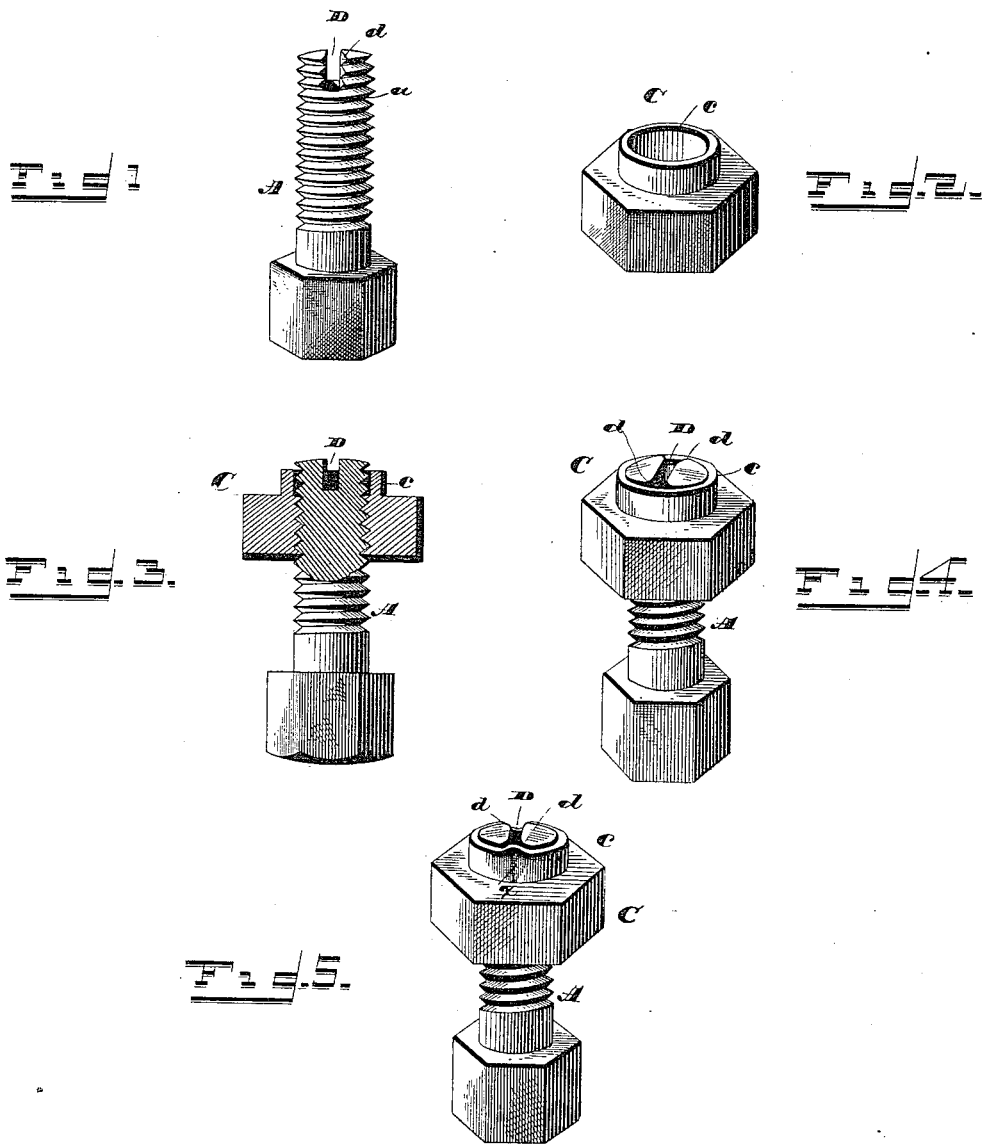
WITNESSES
Frank Hatch.
INVENTOR
Attorney

UNITED STATES PATENT OFFICE.

FRANK HATCH, OF LA CROSSE, WISCONSIN, ASSIGNOR OF ONE-HALF TO BENJAMIN E. EDWARDS, OF SAME PLACE.

NUT-LOCK.

SPECIFICATION forming part of Letters Patent No. 362,742, dated May 10, 1887.

Application filed January 14, 1887. Serial No. 224,376. (No model.)

*To all whom it may concern:*

Be it known that I, FRANK HATCH, a citizen of the United States, residing at La Crosse, in the county of La Crosse and State of Wisconsin, have invented a new and useful Nut-Lock in conjunction with a slotted bolt, of which the following is a specification.

This invention relates to that class of lock-nuts wherein a portion of the nut is arranged to be upset or compressed to engage a cavity or depression in the bolt.

Heretofore it has been proposed to provide a nut of this class with a threaded flange or collar adapted to be bent or pressed into a groove or depression formed in the threaded part of the bolt; but while by this construction the nut could be locked upon the bolt there would be difficulty experienced in attempting to release and readjust the nut to take up wear, or for other purposes, because as the interior of the flange or collar was threaded the operation of bending or compressing a portion of the collar into the groove of the bolt would break the threads and disarrange the pitch so that they would not properly engage the threads of the bolt; hence any attempt to remove or readjust the nut on the bolt would destroy the threads of the latter, and in many instances destroy the threads of the nut proper. Moreover, in the construction I have in mind, as the bent part of the collar would lie closely within the groove or depression, there would be great difficulty in bending it outward to free it from the groove to admit of adjustments.

The object of my invention is to avoid the objections here noted; and to this end my invention consists in a nut provided with an annular unthreaded collar having an internal diameter equal to the base of the threads of the nut; and, further, in the combination, with a bolt provided with a groove, slit, or depression, of a threaded nut provided with an unthreaded annular collar of a diameter to pass freely over the threads of the bolt; and, further, in the combination, with the described nut, of a bolt provided with a transverse slit having beveled side walls.

In the accompanying drawings, Figure 1 is a perspective view of the slitted bolt. Fig. 2 is a perspective view of the nut and its collar. Fig. 3 is an axial section taken through the bolt and nut, and showing the relative diameters of the bolt and collar. Fig. 4 is a perspective view showing the nut screwed loosely on the bolt, and Fig. 5 is a similar view illustrating the nut locked to the bolt.

The bolt A may be of any usual or preferred form, it being provided at its end with a transverse slit, D, or upon one or both sides with longitudinal grooves, the slit or groove forming depressions below the points $a$ of the bolt-threads. I prefer, however, for reasons to be hereinafter given, to use a bolt slitted at the end, as shown in the drawings.

The nut B may be of usual form, except that it is provided at one end with a thin unthreaded annular collar, C, surrounding the threaded bolt-hole of the nut, the internal diameter of this collar being equal to or greater than the diameter of the base $b$ of the threads of the nut, so that the collar will pass freely over the threads of the bolt A without touching the points $a$ of the threads.

To lock the nut B upon the bolt A, the nut is screwed down upon the bolt the desired distance, the collar being then bent, as at $x$, Fig. 5, to protrude within the slit D, it being understood that the metal forming the collar C will be of such character and such thickness as to be bent without fracture.

I prefer to use the slitted bolt rather than one that is longitudinally grooved, for the reason that when a portion of the collar is pressed or bent to lie within the groove of a bolt great difficulty is experienced in again bending it outward to admit of the nut being turned for readjusting; but when said collar is bent to engage the slit of a bolt a tool may afterward be inserted within said slit to simultaneously force said bent portions outward so that the nut may be turned.

In practice, I prefer to slightly bevel the walls of the slit at $d$, where they meet the threads of the bolt, in order that the metal of the collar need not be bent around a sharp or abrupt corner.

The collar may be bent to engage the slit by a blow from a suitable tool, or compressing-nippers may be used to accomplish the purpose.

I claim—

1. A threaded nut provided at one end with an unthreaded annular collar having an interior diameter as great, at least, as the diameter of the nut at the base of the threads, substantially as described.

2. The combination, with a threaded bolt having a groove, slit, or depression, of a threaded nut provided at one end with a collar of a diameter to pass freely over the threads of the bolt without engagement therewith, substantially as described.

3. The combination, substantially as described, of a threaded bolt provided at the end with a transverse slit having beveled side walls, and a threaded nut provided at one end with an unthreaded annular collar of a diameter to pass freely over the threads of the bolt without engagement therewith.

FRANK HATCH.

Witnesses:
ANGUS SCOTT,
LOUIS TILLMANS.